(12) United States Patent
Xia et al.

(10) Patent No.: US 8,852,445 B2
(45) Date of Patent: Oct. 7, 2014

(54) METHODS AND APPARATUS FOR TREATING WATER AND WASTEWATER EMPLOYING A CLOTH DISK FILTER

(75) Inventors: Yongming Xia, Kingwood, TX (US); Jeffrey S. Devine, The Woodlands, TX (US); Charles G. Dannemann, Willis, TX (US)

(73) Assignee: Alfa Laval Ashbrook Simon-Hartley, Inc, Houston, TX (US)

( * ) Notice: Subject to any disclaimer, the term of this patent is extended or adjusted under 35 U.S.C. 154(b) by 345 days.

(21) Appl. No.: 13/284,193

(22) Filed: Oct. 28, 2011

(65) Prior Publication Data

US 2013/0105415 A1    May 2, 2013

(51) Int. Cl.
| | | |
|---|---|---|
| B01D 37/00 | (2006.01) | |
| B01D 29/68 | (2006.01) | |
| B01D 33/50 | (2006.01) | |

(52) U.S. Cl.
USPC ....... 210/791; 210/333.01; 210/411; 210/413

(58) Field of Classification Search
None
See application file for complete search history.

(56) References Cited

U.S. PATENT DOCUMENTS

| | | | |
|---|---|---|---|
| 1,649,220 A | | 11/1927 | Goodloe |
| 1,833,315 A | | 11/1931 | Burhans |
| 2,603,354 A | * | 7/1952 | Way et al. .................. 210/747.5 |
| 2,650,810 A | | 9/1953 | Nordell |
| 2,997,284 A | | 8/1961 | Nechine |
| 3,116,021 A | | 12/1963 | Born |
| 3,339,901 A | | 9/1967 | Walker |
| 3,357,566 A | * | 12/1967 | Schmid et al. ........... 210/333.01 |
| 3,640,395 A | | 2/1972 | Kinney |
| 3,673,048 A | | 6/1972 | Gidge et al. |
| 3,755,055 A | | 8/1973 | Lochner |
| 4,090,965 A | | 5/1978 | Fuchs |
| 4,152,265 A | * | 5/1979 | Meyers ......................... 210/273 |
| 4,167,482 A | | 9/1979 | Mueller |
| 4,273,732 A | | 6/1981 | Roediger |

(Continued)

FOREIGN PATENT DOCUMENTS

| | | |
|---|---|---|
| CA | 2023302 A1 | 2/1991 |
| CN | 201085959 Y | 7/2008 |
| JP | 2005270808 A | 10/2005 |
| NL | 8103750 A | 3/1983 |

OTHER PUBLICATIONS

Benzlers, Series BD Screw Jacks, date unknown, Benzlers.

(Continued)

*Primary Examiner* — Robert James Popovics
(74) *Attorney, Agent, or Firm* — Jeffrey L. Wendt; The Wendt Firm, P.C.

(57) ABSTRACT

A backwash header for a cloth filter disk includes a body having a length a diameter, first and second ends, a longitudinal axis, and an exterior surface, the body defining at least one internal cavity. The body includes at least one suction slot configured to allow fluids and solids to enter the internal cavity from outside of the exterior surface. A structure is attached to a portion of the exterior surface of the body around and extending away from the suction slot to form a chamber defined by the structure and a portion of the exterior surface near the suction slot. The structure is configured to allow fluids and solids to enter the chamber and then the suction slot and cavity from a material being cleaned. Cloth disk filters and methods of treating water and wastewater using the backwash headers and cloth disk filters.

10 Claims, 7 Drawing Sheets

(56) References Cited

U.S. PATENT DOCUMENTS

| | | | |
|---|---|---|---|
| 4,563,277 A | | 1/1986 | Tharp |
| 4,639,315 A | | 1/1987 | Fuchs et al. |
| 4,643,828 A | * | 2/1987 | Barzuza ............... 210/412 |
| 4,646,769 A | * | 3/1987 | O'Brien et al. ............... 134/199 |
| 4,702,847 A | * | 10/1987 | Fux et al. ............... 210/798 |
| 4,725,292 A | | 2/1988 | Williams |
| 4,759,846 A | * | 7/1988 | MacFarlane ............... 210/393 |
| 4,818,402 A | * | 4/1989 | Steiner et al. ............... 210/411 |
| 4,898,671 A | * | 2/1990 | Fux et al. ............... 210/333.01 |
| 5,152,891 A | * | 10/1992 | Netkowicz et al. ............ 210/408 |
| 5,268,095 A | * | 12/1993 | Barzuza ............... 210/143 |
| 5,290,487 A | | 3/1994 | Ludwig |
| 5,356,532 A | | 10/1994 | Wilkins et al. |
| 5,374,360 A | * | 12/1994 | Weis ............... 210/780 |
| 5,409,618 A | | 4/1995 | Price |
| 5,464,542 A | * | 11/1995 | Grienberger et al. ......... 210/784 |
| 5,514,270 A | * | 5/1996 | Barzuza ............... 210/356 |
| 5,560,835 A | | 10/1996 | Williams |
| 5,587,114 A | | 12/1996 | Tharp |
| 5,635,066 A | | 6/1997 | Maurer |
| 5,653,874 A | | 8/1997 | Berry, III |
| 5,690,864 A | | 11/1997 | Tyer |
| 5,876,612 A | | 3/1999 | Astrom |
| 5,925,155 A | | 7/1999 | Rodgers |
| 6,090,298 A | * | 7/2000 | Weis ............... 210/780 |
| 6,103,132 A | | 8/2000 | Seyfried et al. |
| 6,267,879 B1 | | 7/2001 | Gil |
| 6,294,098 B1 | | 9/2001 | Bergmann |
| 6,793,823 B2 | | 9/2004 | Hubenthal et al. |
| 6,858,140 B2 | | 2/2005 | Smith et al. |
| 7,097,046 B2 | * | 8/2006 | Calabrese ............... 210/391 |
| 7,270,750 B2 | | 9/2007 | Galland et al. |
| 7,300,585 B1 | | 11/2007 | Holzwarth et al. |
| 7,485,231 B2 | | 2/2009 | Yeom et al. |
| 7,526,848 B2 | | 5/2009 | Lindbo |
| 7,537,689 B2 | | 5/2009 | Ricketts |
| 7,678,284 B2 | | 3/2010 | Ricketts |
| 8,329,045 B2 | * | 12/2012 | Baumann et al. ............. 210/767 |
| 2002/0050283 A1 | * | 5/2002 | Bergmann ............... 134/33 |
| 2004/0132373 A1 | | 7/2004 | Muller |
| 2005/0000870 A1 | * | 1/2005 | Ricketts ............... 210/107 |
| 2009/0178976 A1 | | 7/2009 | Stevens |
| 2012/0091065 A1 | * | 4/2012 | Xia et al. ............... 210/702 |
| 2013/0068685 A1 | * | 3/2013 | Baumann et al. ............. 210/411 |
| 2013/0105415 A1 | * | 5/2013 | Xia et al. ............... 210/791 |

OTHER PUBLICATIONS

Ashbrook Simon-Hartley, Enviro-Disc9TM) Disk Filter brochure, 2008, 2 pages, Ashbrook Simon-Hartley Operations, LP.

Aqua-Aerobic Systems, "Aqua Cloth Media Filtration", 2006, 8 pages, Aqua-Aerobic Systems, Inc.

Furuya, A., "Evaluation and Design of a Cloth Disk Filter to Meet Title 22 Reuse Criteria", date unknown, publisher unknown.

Ashbrook Simon-Hartley, Is-Disc(TM) booklet, 2009, 47 pages, Ashbrook Simon-Hartley Operations, LP.

Ashbrook Simon-Hartley, "Iso-Disc(TM)" booklet, 47 pages, 2009, Ashbrook Simon-Hartley Operations, LP.

* cited by examiner

METHODS AND APPARATUS FOR TREATING WATER AND WASTEWATER EMPLOYING A CLOTH DISK FILTER

CROSS-REFERENCE TO RELATED APPLICATIONS

This application may be related to assignee's U.S. non-provisional patent application Ser. No. 12/905,454, filed Oct. 15, 2010.

BACKGROUND INFORMATION

1. Technical Field

The present disclosure relates in general to the field of water and wastewater treatment.

2. Background Art

A cloth disk filter typically comprises a tank or vessel, which may be concrete, metal, fiberglass-reinforced plastic (FRP) or other material. A source of screened, secondary effluent flows into the unit from an influent trough, and filtered effluent leaves the unit through an effluent trough. Influent may traverse an influent weir, a scum or hydraulic optimization baffle, then approaches one or more filter cassettes. In currently known systems, each filter cassette may have at least one dedicated backwash vacuum shoe assembly positioned on one side of filter cloth fluidly attached to the central rotatable backwash conduit. In some other known embodiments the filter cassettes rotate during backwashing, while the backwash shoes remain stationary.

Commonly used vacuum backwash shoes consist of using either a flat shoe having one or more suction orifices, or a shoe with lifts on the ends but still having a flat underside with a single slot/opening to sweep a single disk filter cloth clean. The limitations of these common approaches are the following. The shoes are only capable of cleaning a single cloth surface. The leading edge of the flat underside may compress, squeeze, and dislodge captured solids out of the reach of the suction of the backwash system; and even worse may force solids through the cloth to the filtered water side, thereby contaminating the filtered water. The flat underside may not provide for a volume of high turbulence that would enhance the cleaning/scouring effect by filtered water, and may not prevent "short-circuiting" of unfiltered secondary effluent into the shoe. Backwash shoes that raise the shoe off the cloth surface inherently weaken the impact of the suction cleaning Non-metallic shoes, while perhaps less expensive to fabricate compared with stainless steel shoes, represent a potential wear item over years of service. The sharp edges of these shoes naturally tend to abrade, fray, and otherwise wear the cloth surface.

The frequency of employing filtration with chemical treatment is increasing and it has achieved an important role in wastewater treatment. Particularly, chemical treatment is used in phosphorous removal, algae removal, metal hydroxides removal, and high solids removal applications. In those applications, usually the cloth filter disk shows very short filter run and frequent backwash. A reject rate of 20 percent is not uncommon.

There is a need in the cloth filter disk art for improved backwash mechanisms, and cloth disk filters and methods employing the improved backwash mechanisms in water and wastewater treatment facilities.

SUMMARY

Apparatus and methods of the present disclosure reduce or overcome deficiencies of prior art backwash shoes, and cloth disk filters employing them, by providing completely redesigned backwash headers. By including such backwash headers in cloth disk filters, increased backwash efficiencies may be achieved, as further explained herein.

A first aspect of this disclosure is an apparatus comprising:

a body having a length, first and second ends, a longitudinal axis, and an exterior surface, the body defining at least one internal cavity;

the body comprising at least one slot configured to allow fluids and solids to enter the internal cavity from outside of the exterior surface; and a structure attached to the exterior surface of the body around and extending away from the slot to form a chamber defined by the structure and a portion of the exterior surface of the body surrounding the slot, the chamber comprising first and second sub-chambers on opposites sides of the slot;

wherein the sub-chambers have sufficient volume to allow gradual straightening and relaxing of fibers of a filter material being cleaned by the apparatus; and wherein the structure is configured to allow relatively clean fluid to pass through the filter material in a reverse direction upon application of a suction pressure in the internal cavity, and allow the relatively clean fluid and solids previously adhered to the fibers to enter the chamber, then the slot and internal cavity while substantially preventing other relatively less clean fluids and solids from entering the chamber, slot and internal cavity.

A second aspect of this disclosure is a backwash header comprising:

a tubular body having an exterior surface, the tubular body defining at least one internal cavity;

the tubular body comprising at least one slot configured to allow fluids and solids to enter the internal cavity from outside of the exterior surface; and a hood structure attached to a portion of the exterior surface of the body around and extending away from the suction slot to form a chamber defined by the structure and a portion of the exterior surface near the slot, the chamber comprising first and second sub-chambers on opposites sides of the slot, wherein the sub-chambers have sufficient volume to allow gradual straightening and relaxing of fibers of a filter material being cleaned by the backwash header, wherein the hood structure is configured to allow relatively clean fluid to pass through the filter material in a reverse direction upon application of a suction pressure in the internal cavity, and allow the relatively clean fluid and solids previously adhered to the fibers to enter the chamber, then the slot and internal cavity while substantially preventing other relatively less clean fluids and solids from entering the chamber, slot and cavity.

A third aspect of the disclosure is a backwash header comprising:

a tubular body having a length, first and second ends, a longitudinal axis, and an exterior surface, the tubular body defining at least one internal cavity;

the tubular body comprising first and second slots positioned on substantially opposite exterior surface portions of the tubular body, wherein each slot is substantially parallel to the longitudinal axis of the tubular body, each slot has a length that is less than the length of the tubular body, each slot positioned away from the first and second ends of the tubular body, each slot configured to allow fluids and solids to enter the internal cavity from outside of the exterior surface;

first and second hoods attached to separate portions of the exterior surface of the tubular body around and extending away from the respective first and second slots to form first and second chambers defined by the respective hoods and portions of the exterior surface near respective slots, the first and second chambers each comprising first and second sub-chambers on opposites sides of each respective slot, wherein the sub-chambers have sufficient volume to allow gradual straightening and relaxing of fibers of a filter material being cleaned by the apparatus;

wherein the hoods are configured to allow relatively clean fluid to pass through the filter material in a reverse direction upon application of a suction pressure in the internal cavity, and allow the relatively clean fluid and solids previously adhered to the fibers to enter the chambers, then the slots and then the internal cavity while substantially preventing other relatively less clean fluids and solids from entering the chambers, slots and internal cavity, the first and second hoods each comprising first and second cylindrical rods extending substantially parallel to their respective slot and attached to the tubular body, and third and fourth cylindrical rods extending substantially perpendicular to their respective slot and attached to the tubular body.

A fourth aspect of this disclosure is an apparatus for treating water or wastewater comprising:

a vessel having a floor and walls defining a cloth filter zone comprising one or more cloth disk filter cassettes positioned vertically therein, and one or more backwash headers positioned adjacent one main filter surface of at least one cloth filter cassette;

wherein the backwash header comprises a tubular body having a length, a diameter, first and second ends, a longitudinal axis, and an exterior surface, the tubular body defining at least one internal cavity;

the body comprising at least one suction slot configured to allow fluids and solids to enter the cavity from outside of the exterior surface, and a hood structure attached to a portion of the exterior surface of the body around and extending away from the suction slot to form a chamber defined by the structure and a portion of the exterior surface near the slot, the chamber comprising first and second sub-chambers on opposites sides of the slot, wherein the sub-chambers have sufficient volume to allow gradual straightening and relaxing of fibers of a filter material being cleaned by the backwash header, wherein the hood structure is configured to allow relatively clean fluid to pass through the filter material in a reverse direction upon application of a suction pressure in the internal cavity, and allow the relatively clean fluid and solids previously adhered to the fibers to enter the chamber, then the slot and internal cavity while substantially preventing other relatively less clean fluids and solids from entering the chamber, slot and cavity.

A fifth aspect of this disclosure is a method of treating water or wastewater comprising:

flowing a suspended solids stream into a cloth disk filter vessel, the cloth disk filter vessel comprising a cloth filter zone comprising at least one cloth filter media cassette, producing a filter cake on external surfaces of the cloth filter media and a treated effluent stream from each cassette, backwashing (in certain embodiments periodically) the cloth filter media using a backwash header, the backwash header comprising:

a body having a length, a diameter, first and second ends, a longitudinal axis, and an exterior surface, the body defining at least one internal cavity, the body comprising at least one suction slot configured to allow fluids and solids to enter the internal cavity from outside of the exterior surface, and a structure attached to a portion of the exterior surface of the body around and extending away from the suction slot to form a chamber defined by the structure and a portion of the exterior surface near the suction slot, the structure configured to allow fluids and solids to enter the chamber and then the suction slot and internal cavity, the chamber comprising first and second sub-chambers on opposites sides of the slot, wherein the sub-chambers have sufficient volume to allow gradual straightening and relaxing of fibers of the cloth filter media during backwashing; and wherein the structure allows relatively clean fluid to pass through the cloth filter media in a reverse direction upon application of suction in the internal cavity supplied by a backwash pump fluidly connected to the backwash header, and allow a relatively clean fluid plus solids previously adhered to the fibers to enter the chamber, then the slot and then the internal cavity, while substantially preventing other relatively less clean fluids and solids from entering the chamber, slot and internal cavity.

Further aspects and advantages of the disclosure will become apparent by reviewing the description of embodiments that follows.

BRIEF DESCRIPTION OF THE DRAWING

For a more complete understanding of the present disclosure, and the advantages thereof, reference is now made to the following description taken in conjunction with the accompanying drawings, which are representative illustrations and not necessarily to scale, and in which:

FIG. 8 is a schematic side elevation view.

It is to be noted, however, that the appended drawings are not to scale and illustrate only typical embodiments of this disclosure, and are therefore not to be considered limiting of its scope, for the apparatus and methods of the disclosure may admit to other equally effective embodiments. Identical reference numerals are used throughout the several views for like or similar elements.

DETAILED DESCRIPTION

In the following description, numerous details are set forth to provide an understanding of the disclosed backwash headers, cloth disk filters using same, and methods of their use. However, it will be understood by those skilled in the art that the backwash headers, cloth disk filters and methods may be practiced without these details and that numerous variations or modifications from the described embodiments may be possible. All U.S. published patent applications and U.S.

patents referenced herein, as well as any non-published U.S. patent applications and published non-patent literature are hereby explicitly incorporated herein by reference. In the event definitions of terms in the referenced patents and applications conflict with how those terms are defined in the present application, the definitions for those terms that are provided in the present application shall be deemed controlling.

Certain backwash header embodiments of the present disclosure may employ as the body a circular cross-section stainless steel pipe having diameter ranging from about 1-inch to about 6-inches in diameter that is slotted (one or more suction slots having slot width ranging from about 1/16-inch to about 3/4-inch when the diameter of the tubular body is within the 2-6 inch range). In exemplary embodiments the backwash header has two suction slots positioned 180 degrees from each other. The backwash headers of the present disclosure, which may be described as "slotted pipe backwash headers", may be sandwiched between surfaces of two disk filter cassettes so that a single backwash header can effectively clean two surfaces at a time. At a distance measured tangential to the pipe of approximately 1/4-inch to 1 inch from the slot opening, on both sides of the slot openings, cylindrical rods, which may be stainless steel rods (1/8-inch to 1/2-inch diameter) may be welded or otherwise attached along the length of the slot. These cylindrical rods serve to form an effective seal, allowing relatively clean (filtered) fluid to be drawn through the filter cloth in "reverse direction" during backwashing and carry captured solids away from the filter cloth and into the chamber formed by the rods, into the slot, and into the internal cavity of the pipe, while substantially preventing "short-circuiting" of relatively unclean (unfiltered secondary effluent) form entering the backwash header slot during backwashing. In certain embodiments, at or near the ends of the slots, two similar sized (diameter) cylindrical rods may be connected perpendicularly to the ends of the cylindrical rods running the length of the slots to effectively form a cleaning hood volume or chamber between the cloth surface and the backwash header. Importantly, the longitudinal rods may be set back from the slot to form first and second sub-chambers on opposites sides of the slot, wherein the sub-chambers have sufficient volume to allow gradual straightening and relaxing of fibers of a filter material being backwashed by the apparatus. In certain embodiments, this gradual straightening and relaxing may comprise an angular reversal of at least some of the fibers of the filter cloth during a backwashing operation, as further explained herein. The angular reversal of fibers may assist in releasing particles trapped in filter media.

Benefits of the backwash headers of the present disclosure are significant in number and degree of benefit. One benefit, already alluded to, is that they may be structured to clean two surfaces at a time versus the current shoes' ability to clean only one surface at a time. This feature may minimize the number of headers and complexity of filters employing them, thereby making cloth filters more cost-effective and easier to construct and maintain.

In certain embodiments, the cleaning hood formed by the structure attached to the exterior surface of the header produces sub-chambers having relatively less turbulent (in certain embodiments laminar) cleaning conditions on either side of the slot opening, and a relatively more turbulent region directly above the slot. The fibers of the filter cloth experience the first relatively less turbulent space, then a relatively more turbulent space, and then a second relatively less turbulent space, further enhancing the cleaning and scouring action of the backwash action, while not abruptly straightening or re-flattening the fibers of the filter cloth. The slot may then have a width that is smaller than the length of fibers in the filter material. In certain embodiments, this leads to another key benefit of the backwash cleaning headers described herein: the required backwash rate may be reduced from approximately 2.5 gallon per minute (gpm) per inch of slot length to approximately 0.5 gpm per inch of slot. This may significantly reduce the amount of backwash water (which has already been filtered by the cloth) that needs to be pumped back through the filter clot in the reverse direction, thereby proportionally reducing the energy costs for operation.

In yet other embodiments, the smooth (in some embodiments circular) shape of the structure extending away from the header body may minimize abrasion of the filter cloth, as there are no edges that would tend to abrade and wear the cloth. Furthermore, the ability to fabricate the headers of the present disclosure from readily available stainless steel materials/components in certain embodiments may make the backwash headers of the present disclosure more durable and cost-effective than shoes fabricated from plastic materials such as specially formed ultra-high molecular weight (UHMW) polyethylene or other non-metallic components, although these materials are not ruled out.

In certain apparatus embodiments, the slot may be generally parallel to the longitudinal axis of the body of the backwash header, and may have a slot length less than the length of the body.

In certain apparatus the structure may comprise a hood. In certain exemplary embodiments the body may be tubular, and the hood may comprise first and second cylindrical rods extending substantially parallel to the slot and welded or otherwise attached to the tubular body, and third and fourth cylindrical rods extending substantially perpendicular to the slot and welded and otherwise attached to the tubular body.

In certain apparatus embodiments, the first and second cylindrical rods may each have a rod diameter such that the rod diameter is one quarter of the diameter of the tubular body or less. In certain other embodiments, the first and second cylindrical rods may each have a rod diameter such that the rod diameter is one eighth of the diameter of the tubular body or less.

Certain backwash header apparatus embodiments may have a single slot. In certain embodiments the slot may be substantially parallel to the longitudinal axis of the body of the backwash header. In certain exemplary embodiments the slot may have a length that is less than the length of the body. In certain embodiments, the slot may be positioned away from the first and second ends of the tubular body.

Certain other backwash header embodiments may comprise two slots positioned on substantially opposite exterior surface portions of the body, wherein each suction slot is substantially parallel to the longitudinal axis of the body. In certain of these embodiments, each slot may have a length that is less than the length of the body. In certain embodiments the lengths of the two slots may be substantially equal, although this is not a requirement. The slots may be positioned away from the first and second ends of the tubular body.

Certain backwash header embodiments may comprise first and second mounting brackets attached to the body. In certain embodiments the first and second mounting brackets may engage respective first and second tracks in a cloth filter disk apparatus.

Certain backwash header embodiments may comprise a flange connected to the first end of the body, the flange fluidly connected to a backwash suction pump of a cloth filter disk apparatus.

In certain backwash header embodiments the body may comprise a connection allowing the backwash header to be connected to an actuator mounted on a cloth filter disk apparatus.

In certain backwash header embodiments the body may be tubular having a cross-sectional shape selected from the group consisting of circular, oval, and polygonal.

Certain methods of treating water or wastewater may comprise methods wherein the cloth filter media is selected from the group consisting of needled nonwoven polyamide filter media, acrylic cloth, polyester cloth, nylon fibers, other carpet-like materials, and combinations thereof. In certain other methods the suspended solids stream may be a chemically-induced flocculated stream, wherein the flocculated stream percolates up through a sludge blanket comprising previously flocculated solids.

Certain other methods may comprise backwashing one or more of the cloth disk filters periodically using one or more rotating backwash headers. In certain other embodiments, one or more of the filter cassettes rotate on a central shaft while the backwash headers remain stationary during backwashing. In certain other embodiments, backwashing may be accomplished using cross-width backwash headers that traverse up and down, or side to side, or any angle to horizontal, and remove waste from substantially all of the surface area of the filter cloths. Yet other methods may comprise slideably moving one or more, or all, of the cloth disk filter cassettes vertically in vertical cassette guide members, allowing the cassettes to be moved vertically up and down adjacent one or more stationary backwash headers. As used herein, the term "adjacent" when discussing the relative positions of a backwash header and filtration material, includes both situations where the hoods of the backwash headers touch the filter material, and situations where there is no contact between the backwash headers and the filtration materials.

Certain exemplary methods may comprising moving the backwash header in a first direction across a surface of the cloth filter media during a first period of time, and reversing the direction of movement of the backwash header to move across the same surface of the cloth filter media during a second period of time. This may provide more thorough cleaning, while reducing wear of the cloth filter media.

Figure 1:
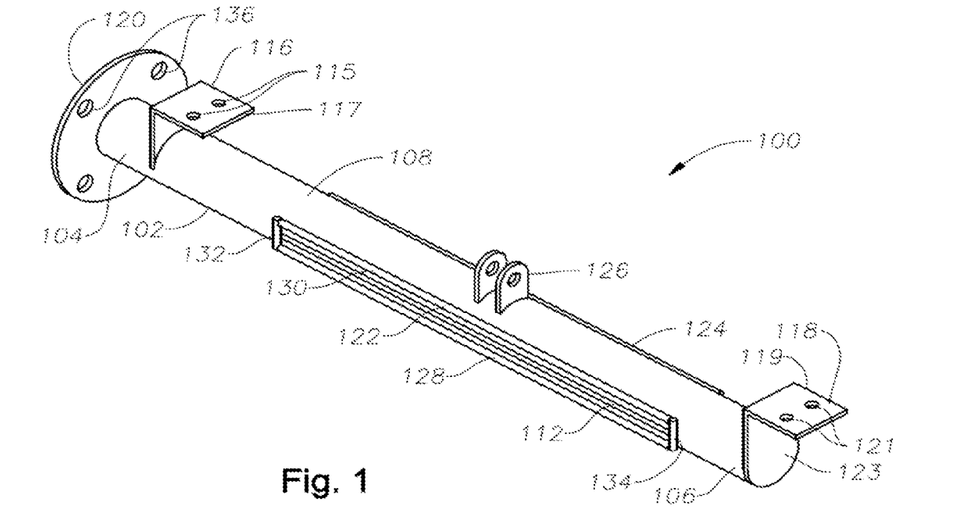
FIG. 1 is a schematic perspective view of one embodiment of a backwash header in accordance with the present disclosure.

Referring now to the drawing figures, FIG. 1 is a schematic perspective view of one embodiment 100 of a backwash header in accordance with the present disclosure, having a tubular body 102, a first end 104, a second end 106, and an exterior surface 108. Tubular body 102 defines at least one cavity 110, in this embodiment a single cavity 110, more clearly visible in FIG. 4. Although embodiment 100 comprises a tubular body that is substantially cylindrical (circular) in cross-section, "tubular" is not meant to be limited to cylindrical bodies. Tubular bodies having oval or polygonal (for example, rectangular and triangular) bodies may be envisioned and are considered within the present disclosure. Tubular body 102 may be steel, such as 304 or 316 stainless steel, titanium, aluminum, or other metal or metal alloy. In certain embodiments tubular body may be polymeric, such as a thermoplastic polymer, thermoplastic elastomer, or thermosetting polymer, or fiberglass reinforced plastic (FRP). If polymeric, the polymer may be filled or unfilled.

Figure 4:
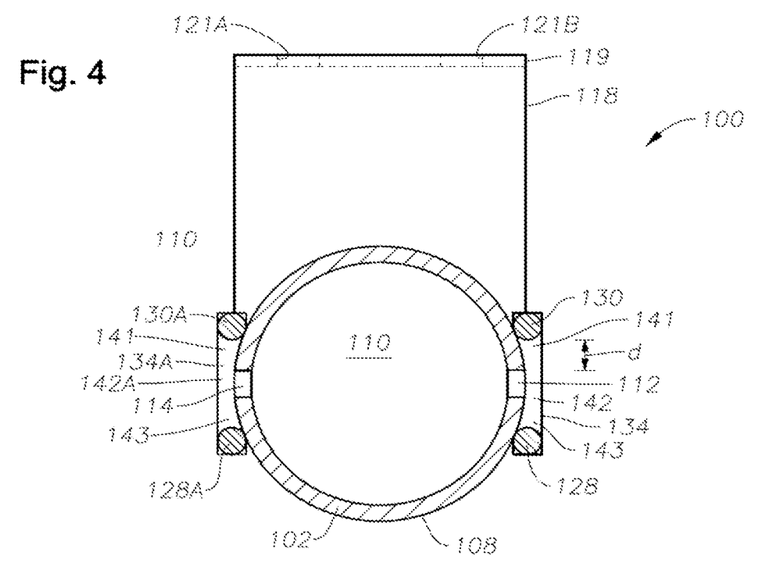
FIG. 4 is a schematic cross-sectional view of the backwash header embodiment of FIG. 1 taken along section A-A of FIG. 3.

Again referring to FIG. 1, embodiment 100 includes a first suction slot 112 and a second suction slot 114 (not viewable in FIG. 1, but viewable in FIG. 4). Mounting brackets 116 and 118 are provided that allow mounting to a cloth filter disk system, not illustrated in FIG. 1. Mounting bracket 116 includes a extension 117 having a pair of holes 115 for screws, rivets, and the like. Similarly, mounting bracket 118 includes an extension 119 having a set of holes 121 for screws, rivets, and the like. Embodiment 100 also includes a flange 120 having four mounting holes 136, allowing flange 120 to be attached to a backwash suction pump, not illustrated. On the opposite end, mounting bracket 118 includes a vertical portion 123 that seals tubular body 102, for example by welding, although other sealing elements may be used, such as gasket arrangement, O-rings, and the like. Embodiment 100 also includes an actuator clevis bracket 126 that allows backwash header 100 to be attached to a backwash header actuator, not illustrated.

Embodiment 100 includes a pair of hoods 122 and 124, each hood including first and second long cylindrical rods 128, 130 in this embodiment, and a pair of short cylindrical end rods 132 and 134. Cylindrical rods 128 and 130 are substantially parallel to a longitudinal axis "A" (FIG. 2) of tubular body 102, whereas cylindrical rods 132 and 134 are substantially perpendicular to longitudinal axis A. Cylindrical rods 128, 130, 132, and 134 may be steel, such as 304 or 316 stainless steel, titanium, aluminum, or other metal or metal alloy. In certain embodiments they may be polymeric, such as thermoplastic elastomeric. In certain embodiments they are all the same material, but this is not required. If metallic, they may be welded, brazed, clipped, banded or otherwise attached to exterior surface 108 of tubular body 102. If polymeric, they may be attached using glue, plastic or rubber banding, clips or the like.

Figure 2:
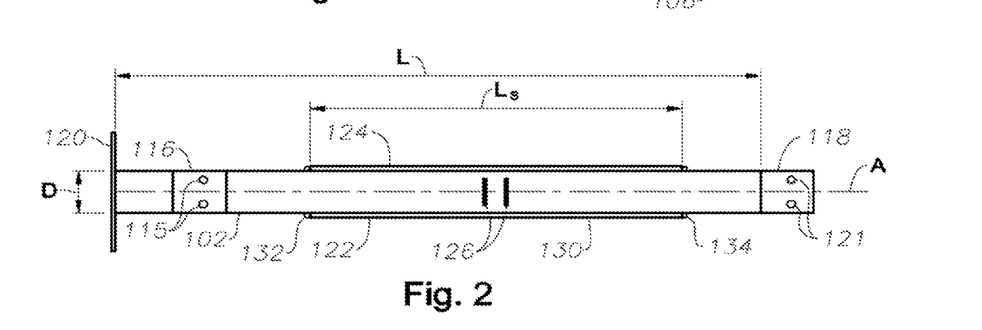
FIG. 2 is a plan view of the backwash header embodiment of FIG. 1.
Figure 3:
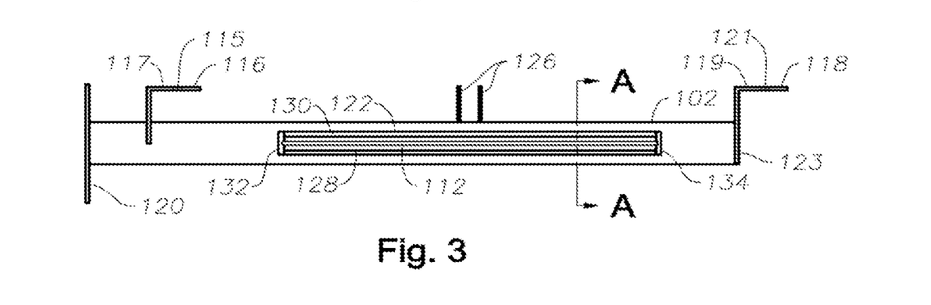
FIG. 3 is a side elevation view of the backwash header embodiment of FIG. 1.

Referring now to FIGS. 2 and 3, FIG. 2 is a plan view of backwash header embodiment 100 of FIG. 1, and FIG. 3 is a side elevation view of backwash header embodiment 100 of FIG. 1. Tubular body 102 has a length "L", while slots 112 and 114 each have a length $L_s$ in this embodiment. The lengths of slots 112 and 114 are not necessarily equal in all embodiments. Tubular body 102 also has a diameter D in embodiment 100. Generally, the ratio of L to D may range from about 3:1 to about 100:1, or from about 5:1 to about 50:1, or from about 5:1 to about 10:1. The ratio of L to $L_s$ may range from about 1:1 to about 10:1, or from about 2:1 to about 5:1. The diameter of cylindrical rods 128 and 130 may be ¼ or less of the diameter D of tubular body 102, or ⅛ or less than D. The diameter of cylindrical rods 132 and 134 may or may not be the same as the diameter of rods 128 and 130.

FIG. 4 is a schematic cross-sectional view of backwash header embodiment 100 of FIGS. 1-3 taken along section A-A of FIG. 3. Apparent in this view of backwash header embodiment 100 are a pair of chambers 142 and 142A, each including a pair of sub-chambers 141, 143 on either side of slots 112, 114. Chamber 142 is formed by cylindrical rods 128, 130, 134, and 132 (the latter not illustrated in FIG. 4), and a portion of exterior surface of tubular body 102 between rods 130 and 128. Similarly, Chamber 142A is formed by cylindrical rods 130A, 128A, 134A, and 132A (the latter not illustrated in FIG. 4), and a portion of exterior surface of tubular body 102 between rods 128A, 130A. Sub-chambers 141, 143 are the sub-chambers of random, high turbulence cleaning on either side of slots 112, 114, discussed earlier herein, that further enhance the cleaning and scouring action of the backwash action, while not abruptly straightening or re-flattening the fibers of the filter cloth. In embodiment 100, cylindrical rods 128, 130 are positioned a distance "d" measured tangential to the pipe of approximately ¼-inch to 1 inch from each slot 112, 114, on both sides of each slot. Cylindrical rods 128, 130 may be stainless steel rods having diameter ranging from about ⅛-inch to about ½-inch, and may be welded or otherwise attached along the length of the slots.

Figure 5:
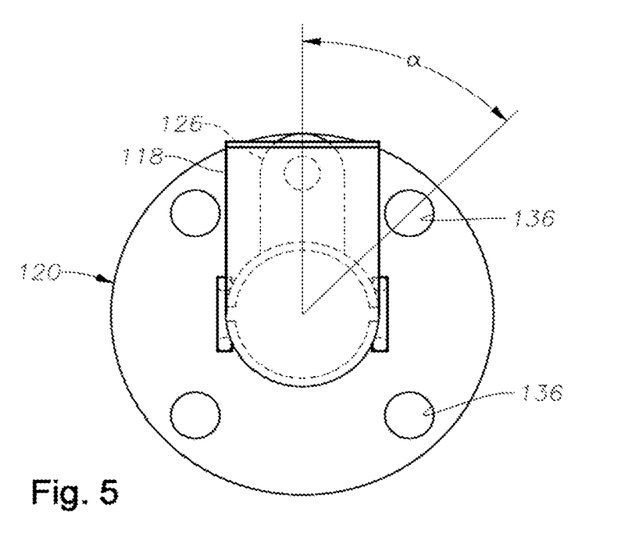
FIG. 5 is a schematic end elevation view of the backwash header embodiment of FIG. 1.

FIG. 5 is a schematic end elevation view of backwash header embodiment 100 of FIG. 1, partially in phantom illustrating schematically the position of holes 136 in flange 120 in this embodiment. Angle α may range from about 20 to about 50 degrees, and in embodiment 100 is 45 degrees.

Figure 6:
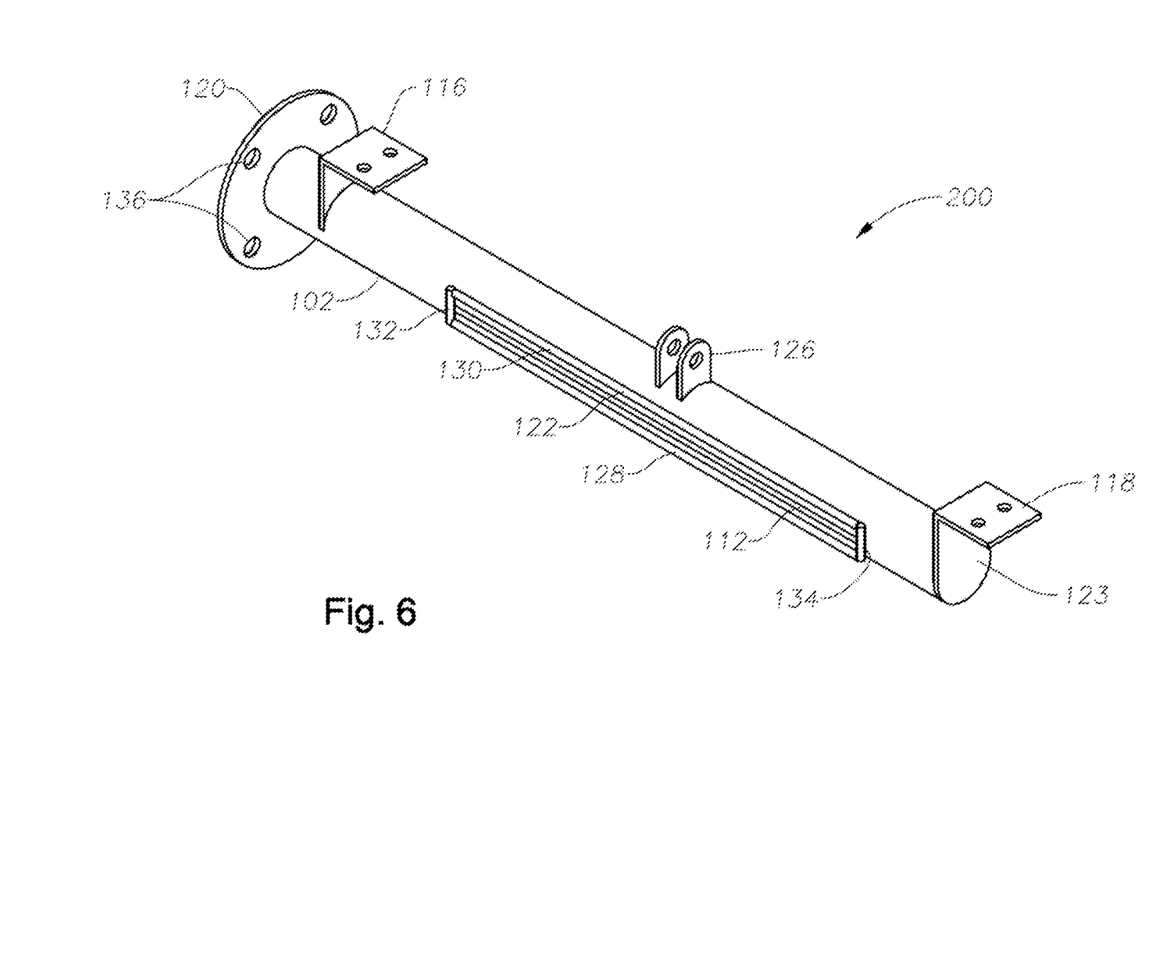
FIG. 6 is a schematic perspective view of another embodiment of a backwash header in accordance with the present disclosure.
Figure 8:
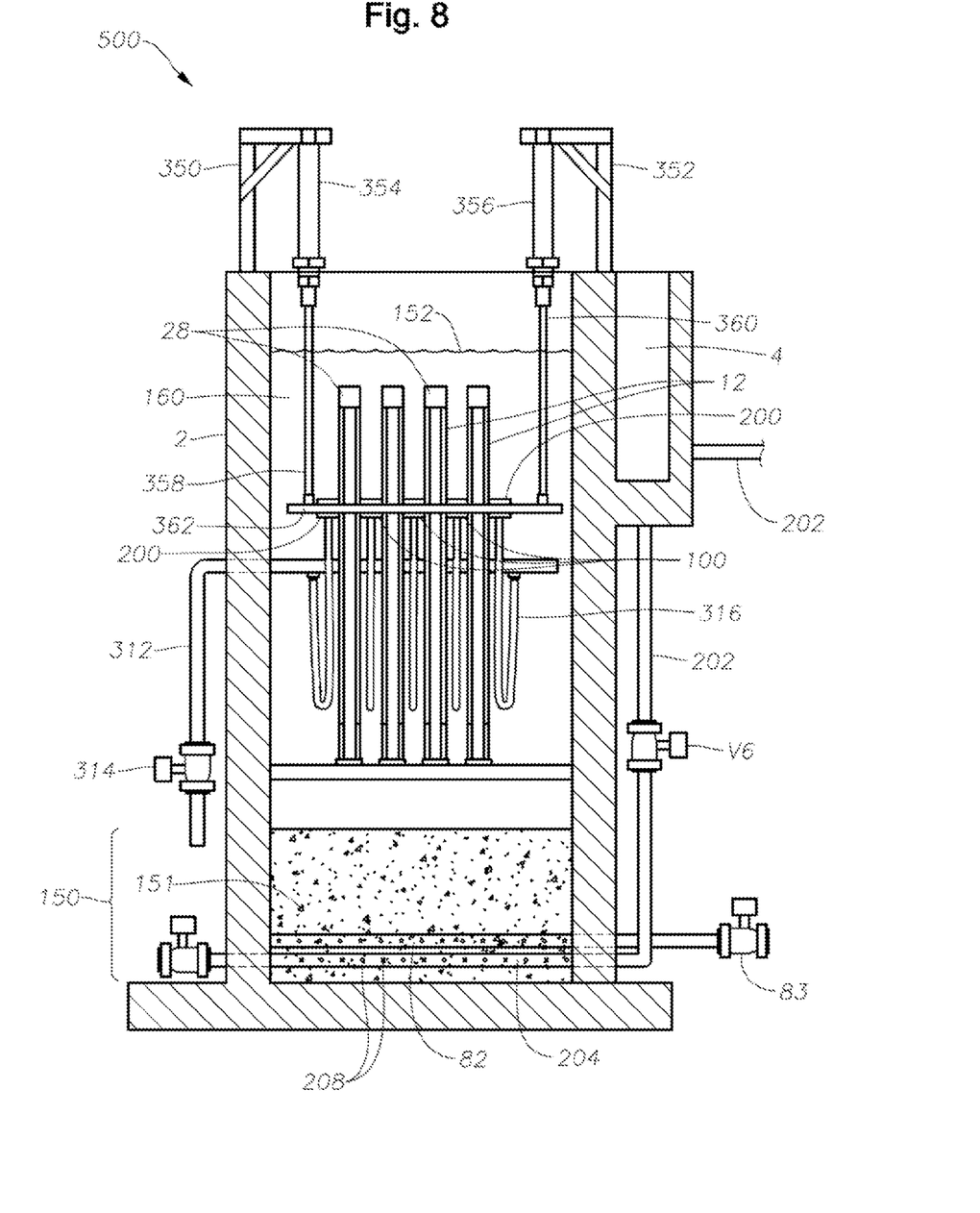

FIG. 6 is a schematic perspective view of another embodiment 200 of a backwash header in accordance with the present disclosure. Backwash header 200 differs from embodiment 100 of FIGS. 1-5 in that embodiment 200 only features one suction slot 112. As illustrated in FIG. 8, backwash headers 200 may be positioned to clean the outer cloth surfaces of the outer most filter cassettes, while backwash header embodiment 100 may be used between adjacent cassettes.

Figure 7A:
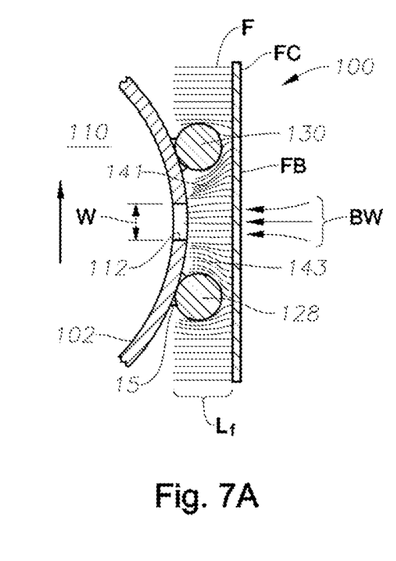
FIGS. 7A-C are a schematic cross-section views of three backwash header embodiments cleaning a cloth of a cloth filter disk.

Referring now to FIG. 7, FIGS. 7A-C are schematic cross-sectional views of three different backwash header embodiments 100, 300, and 400 cleaning a filter cloth "FC" of a cloth filter disk. Filter cloth FC comprises a filter cloth backing FB and a plurality of fibers F having length $L_f$. In all three embodiments, the backwash header is moving upwards, in the direction of the arrow, it being understood that the backwash headers could move in the opposite direction; or filter cloth FC could move while the backwash header is stationary, or both the backwash header and filter cloth FC could move in opposite directions. It is also understood that backwash headers may move first in one direction and then in the opposite direction in random or non-random time periods over substantially the same area of filter cloth FC. Longitudinal cylindrical rods 128, 130, along with transverse cylindrical rods 132, 134 (not illustrated in FIG. 7A) and sub-chambers 141, 143 play a significant role in backwash header embodiments of this disclosure such as embodiments 100, 200, 300, and 400 inasmuch as sub-chambers 141 and 143 (FIG. 7A), sub-chambers 141A, 143A (FIG. 7B), and sub-chambers 141B, 143B (FIG. 7C) function to provide regions or spaces of transition allowing fibers F to remain partially erect and/or non-flattened against filter cloth backing FB in those regions or spaces. This allows slot width W to be less than the fiber length $L_f$, and allows less backwash fluid to be used relative to systems with slot widths greater than the fiber length $L_f$. Due to the combined movement of the header and the smooth geometry of cylindrical rods 128, 130, dislodged solids may be effectively removed via backwash fluid BW flowing in reverse direction (opposite normal filtration flow direction) through filter cloth backing FB, fibers F attached to backing FB near slot 112, then through slot 112, and into internal cavity 110. The smooth circular shape of compression rods 128, 130 may minimize abrasion of filter cloth FC, as there are no edges that would tend to abrade and wear cloth FC. Sub-chambers 141, 143 which are formed primarily by compression rods 128, 130, and portions of the external surface of header body 102, produce a volume of high turbulence around slot opening 112 (and 114 when using embodiment 100), further enhancing the cleaning and scouring action of the backwash, and gradually opens and straightens the cloth fibers F in the vicinity of slot 112. In certain embodiments, where the fibers F normally extend away from filter cloth backing FB such as illustrated in embodiment 100, this gradual straightening and relaxing may comprise an angular reversal of at least some of the fibers F of the filter cloth during a backwashing operation. As illustrated in FIG. 7A, fibers in sub-chamber 141 that are behind rod 130 are generally angled downward toward slot 112, while these fibers will be experience a reversal or waving action as they approach rod 128 in sub-chamber 143. The gradual straightening, angular reversal or waving action of the fibers may also allow smaller width and more powerful cleaning slots to be used in apparatus of the present disclosure.

Figure 7B:
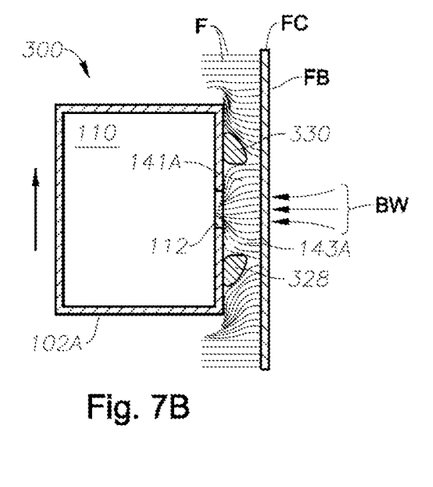
Figure 7C:
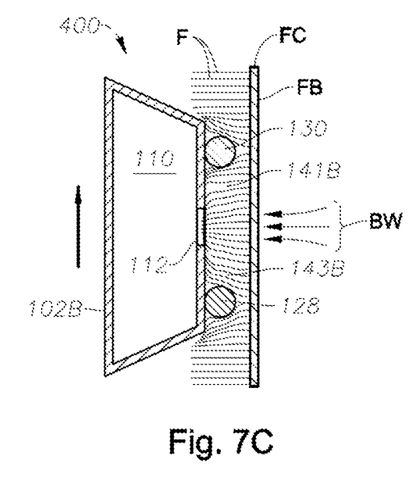

Backwash header embodiments 300 and 400 illustrated schematically in FIGS. 7B and 7C, respectively, are similar to embodiment 100 illustrated schematically in FIG. 7A, except that backwash header embodiment 300 has a rectangular-shaped cross-section body 102A, while backwash header embodiment 400 has a trapezoidal-shaped cross-section body 102B. A further difference in embodiment 300 is provisional of non-circular cross-section hood elements 328, 330, causing slightly different shaped sub-chambers 141A, 143A.

Embodiment 100 as illustrated schematically in FIG. 7A also illustrates welds 15, one way of attaching cylindrical rods 128, 130 to body 102. Other attachment mechanisms may be envisioned, such as brazing, soldering, use of adhesives, clips, bands, snaps, and the like.

In certain embodiments, another key benefit of backwash cleaning headers of the present disclosure is that the required backwash rate may be reduced from approximately 2.5 gpm per inch of slot length $L_s$ to approximately 0.75 gpm per inch of slot length $L_s$. This may significantly reduce the amount of backwash water that needs to be pumped, thereby proportionally reducing the energy costs for operation.

Figure 9:
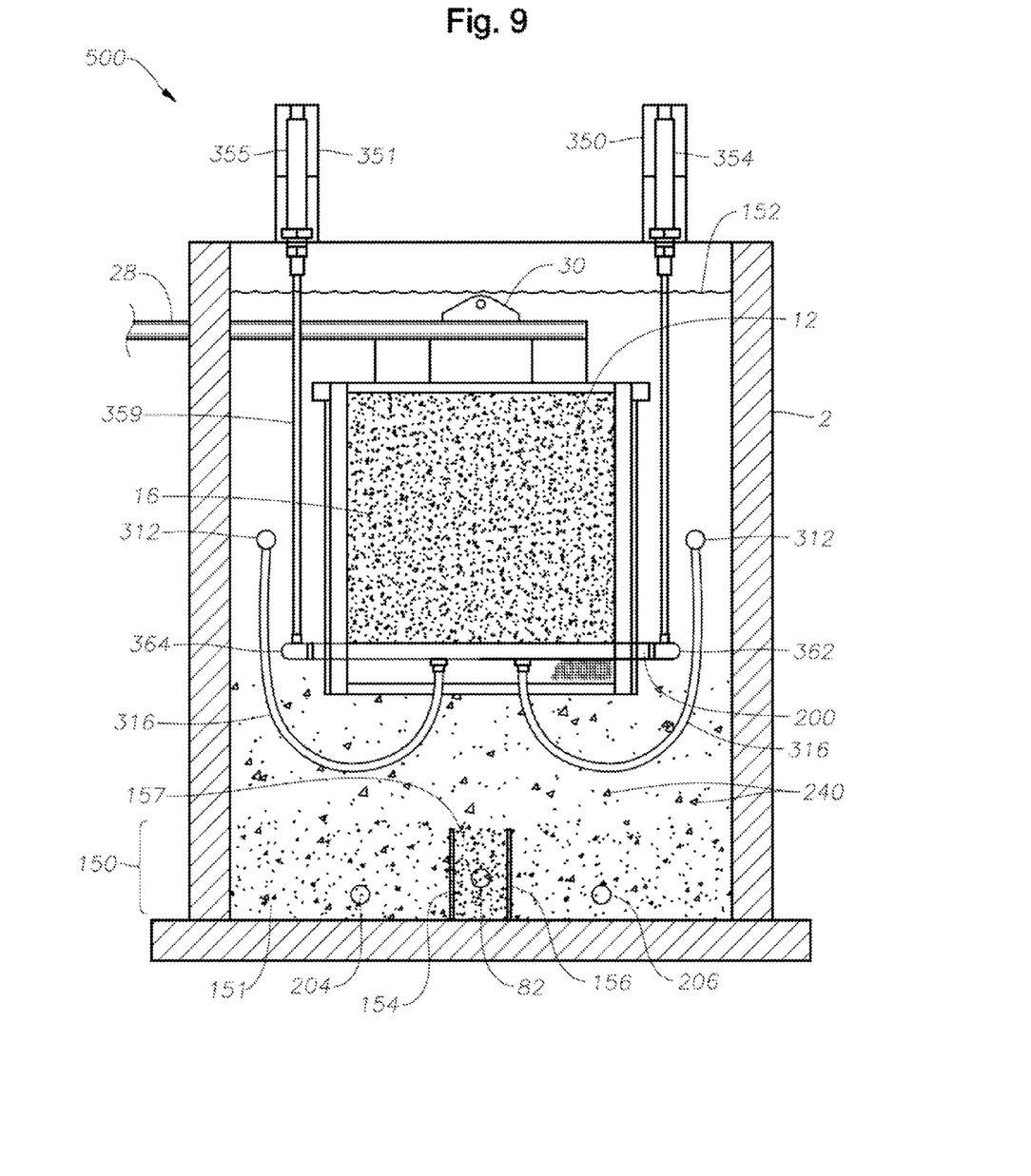
FIGS. 9 and 10 are schematic end elevation views of a cloth disk filter embodiment in accordance with the present disclosure.
Figure 10:
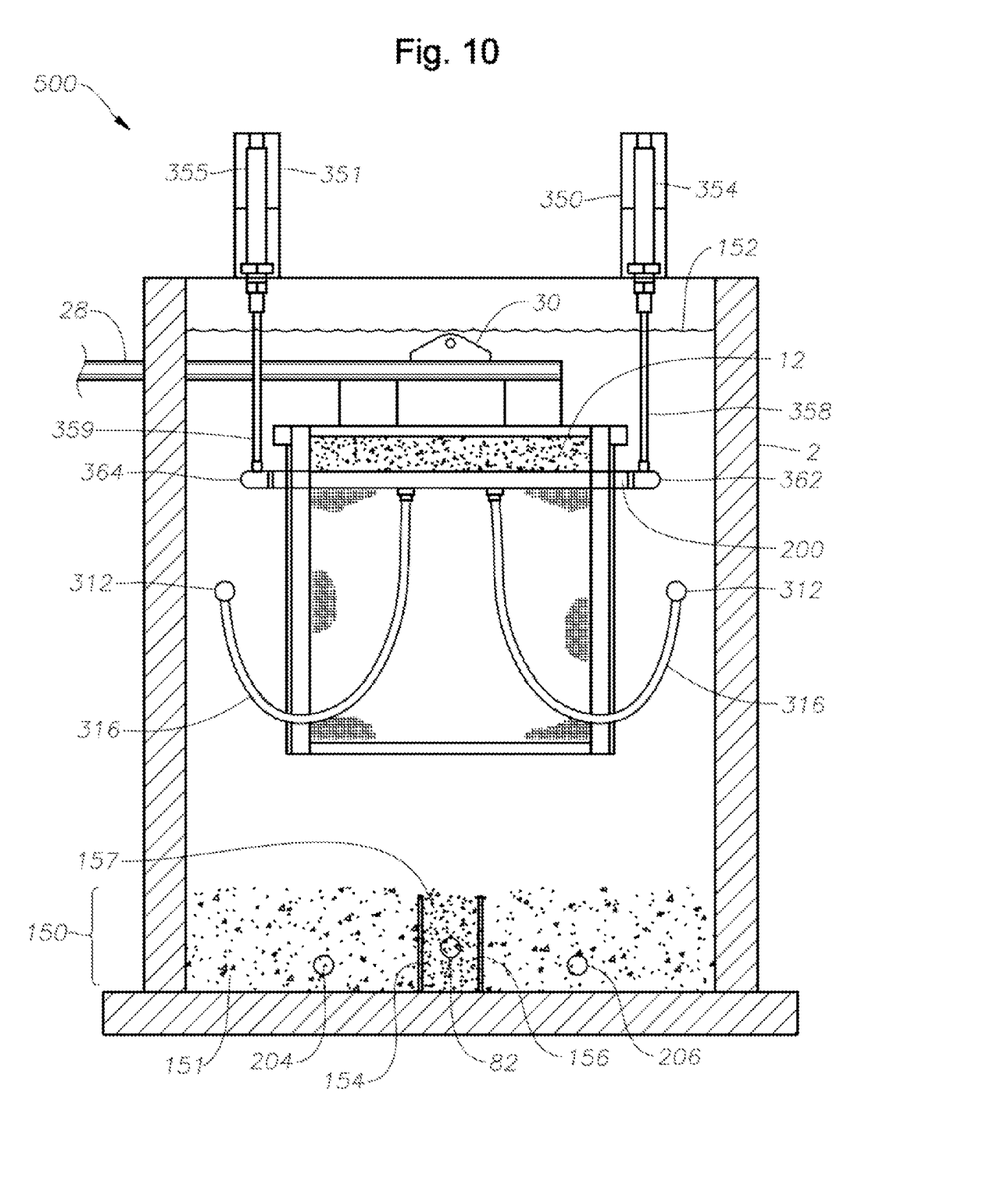

Referring now to FIGS. 8-10, FIG. 8 is a schematic side elevation view, and FIGS. 9 and 10 are schematic end elevation views of a cloth disk filter embodiment 500 in accordance with the present disclosure. Embodiment 500 employs a combination of a sludge blanket and a cloth disk filter having four filter cassettes 12 in a cloth filter zone 160, as described in assignee's co-pending application Ser. No. 12/905,454, filed Oct. 15, 2010. Embodiment 500 includes an influent conduit 202, in this embodiment retrofitted into an existing influent trough 4, but this is not necessary in new installations. Embodiment 500 may include features such as an influent screen and V-notch weir, neither of which is illustrated, which direct influent through a conduit 202 and valve V6 to influent distribution headers 204, 206 (only 204 is visible in FIG. 8) positioned just above the floor of vessel 2. Influent distribution headers 204, 206 are, in embodiment 500 generally positioned parallel to the side walls of vessel 2, but this is merely one possible arrangement. For example, another possible arrangement would be to have "T" or "X" shaped headers. In any case, headers 204, 206 each have a plurality of outlet holes or apertures 208 which allow influent to flow out of distribution headers 204, 206 and into sludge blanket zone 150. (The use of a sludge blanket is optional.) Influent percolates through sludge blanket zone 150, allowing flocculated solids in the influent to intimately contact previously flocculated material and sludge in a sludge blanket 151. The influent distribution also creates a quiescent environment (low velocity currents) to help prevent disturbance of sludge blanket 151. Water level 152 in vessel 2 may be monitored and controlled by initiating backwashing using any well-known backwash assembly. Any flocculated solids 240 that are not captured in sludge blanket 150 are routed to the cloth 16 of filter cassettes 12. One or more valves (not illustrated) may be used to throttle or completely shut off flow of influent to distribution headers 204, 206. They may also be automatic flow-controlled valves, communicating with a PLC or other type of automatic controller to control level 152 according to a setpoint level and/or setpoint flow rate.

Another optional feature is the provision of a sludge concentration zone 157 between a pair or plurality of plates 154, 156 extending upward from the floor of vessel 2 at an angle from horizontal. Sludge concentration zone 157 may be described as a quiescent thickening zone. It need not be located as illustrated in the middle of vessel 2, this being only one possible embodiment. Embodiment 500 also illustrates an optional conduit 82 provided for withdrawing concentrated sludge from sludge concentration zone 157 when desired, for example through a valve 83. Concentrated sludge is typically routed to a belt filter press or to storage prior to being processed in a belt filter press, or other type of dewatering press. The dewatered sludge may be burned, landfilled, or otherwise disposed by alternate acceptable means if it meets applicable quality standards. Cleaned effluent fluid flows out of the filter through one or more effluent conduits 28, which may be manifolded together.

Another optional feature may be to include corrugated plates fastened to walls of vessel 2. Corrugated plates may be used to induce faster coalescence of flocs, or to maintain a certain consistency of floc in sludge blanket zone 150. This media may provide a suitable surface for individual flocs to meet and grow, or coalesce, into larger flocs. As the individual flocs grow in size the buoyancy of the flocs decrease, and fall toward the floor of the vessel and/or aggregate in the sludge blanket zone due to the fact that the specific gravity of the floc is more than the specific gravity of water.

Referring again to FIG. 8, backwash headers 100 and 200 are fluidly connected to one or more backwash collection headers 312 via one or more flexible conduits 316. Backwash flow may be controlled via one or more valves 314. In embodiment 500, cross-width backwash headers 100 and 200 are moved by a drive assembly comprising supports 350, 352 (there are only two visible in each of the various views, but four total in embodiment 500), corresponding cylinders 354, 356 (a total of four, only two of which are visible in embodiment 500), and corresponding telescoping tie-rods 358, 360 (a total of four, only two of which are visible in embodiment 500). FIGS. 9 and 10 illustrate support 351, cylinder 355, and its corresponding telescoping tie-rod 359. Cylinders 354, 356 are actuated (electronically, pneumatically, or hydraulically) to force corresponding telescoping tie-rods 358, 360 to move upwards or downwards in telescoping fashion. Tie-rods 358, 360 are connected to support arms 362, 364, which in turn are connected to cross-width backwash headers 100 and 200, as illustrated. Support arms 362, 364 and backwash headers 100 and 200 form a backwash assembly. The entire backwash assembly, including backwash headers 100 and 200, are raised or lowered to wash all sides of filter cassettes 12 simultaneously. For example, in embodiment 500 of FIGS. 8-10, four filter cassettes having a total of eight filter surfaces to be cleaned would require three backwash headers of embodiment 100, and two backwash headers of embodiment 200. FIG. 9 illustrates the position of backwash header 200 at or near the beginning of a cleaning cycle, while FIG. 10 shows backwash header 200 near the end of a cleaning cycle.

As an alternative to the drive mechanism described in relation to FIGS. 8-10, the backwash headers may be driven by a drive assembly comprising a drive frame weldment which supports a drive motor, a drive shaft, a miter gear box, lifting screw jacks, and ancillary mechanisms (such as vertical backwash header guide members) to impart the vertical cleaning (backwash) motion. Other header drive mechanisms are described in assignee's co-pending U.S. non-provisional patent application Ser. No. 12/905,454, filed Oct. 15, 2010, incorporated herein by reference.

In certain embodiments, when filtration headloss reaches a filtration termination set point, a backwash flow control valve may open. Then the backwash headers move vertically, sweeping the filter cloth surface from the bottom to top (or alternatively from top to bottom, or periodically switching directions). Also as described in the '454 application, the backwash header travel stop may be controlled by a proximity switch, for example an infrared proximity switch, or other acceptable motion controller. Certain embodiments may comprise a backwash pump fluidly connected to the backwash header. In certain embodiments, the backwash pump is not required. Backwash driving head could simply be the level difference between the filtration termination set level and the backwash header discharge level, thereby eliminating the need for the backwash pump. It will be understood by those skilled in the art that cloth filter disks may comprise other various features, such as described in assignee's co-pending Ser. No. 12/905,454, and the embodiments described in this disclosure and the '454 application may be combined in certain other embodiments, and with other features that are not described herein but are normally associated with cloth disk filters. For example, the coalescing plates described above may be present in conjunction with the optional conduits and valves described above.

Cloth disk filters are sized on the basis of "hydraulic loading rate", and 3 to 6 gallons/day/ft$^2$ (gpd/ft$^2$) is typical for design average flow rates of prior art cloth disk filters. For flocked phosphorous solids removal, however, prior art cloth disk filter surface overflow rates typically only range from about 2 to about 4 gpd/ft$^2$. Apparatus of the present disclosure utilizing a sludge blanket may achieve, in some embodiments, from about 3 to about 6 gpd/ft$^2$ even for flocked phosphorous solids removal, which is a 50 percent or 100 percent increase of surface overflow rate over prior art cloth disk filters treating phosphorous-based solids. The present inventive methods and apparatus employing sludge blankets are not seeking large removal of solids in the sludge blanket, but removal of enough solids to off-load the filter cloth media. The modified cloth disk filters of this disclosure may be part of a packaged water or wastewater treatment plant.

It should be emphasized that use of a sludge blanket is not required to achieve the advantages of the backwash headers described herein. However, in operation of methods and apparatus of the disclosure utilizing a sludge blanket, the first choice for solids removal is from the sludge blanket zone and secondly from the cloth disk filter zone to achieve the desired solids removal. The primary goal is to remove only the best settling solids using the sludge blanket. Scum forming and slow settling material is allowed to proceed to the filter cloth media where they would be removed. Cloth disk filter apparatus of this disclosure employing a sludge blanket may employ one or more plate settlers. These plates may be used to increase settling rate of floc, minimizing sludge blanket disturbance and carry-over of settled sludge to the filter media, thereby maximizing the effective volume and surface area of the cloth disk filter. To ensure that the sludge blanket remains intact in the sludge blanket zone and substantial amount of floc is not carried over to the cloth filter zone, the velocity of the upwardly moving flocculated influent from the distribution headers is maintained at a velocity just over the settling velocity of the floc, but not more than a velocity that would fluidize or substantially disrupt the sludge blanket by becoming too turbulent. By experiment, this velocity has been determined to range from about 1 to about 2 gallons per minute/ft$^2$ for cloth disk filters modified to have influent distribution headers and other features described herein for creating a sludge blanket zone near the floor and extending upwards from the floor of a cloth disk filter.

Filter cloth media useful in the various embodiments of this disclosure may, in certain embodiments, be able to filter out solids having particles sizes of 10 microns or larger, or 5 microns and larger, and withstand washing or mechanical abrasion enough to remove retained materials, and may be characterized as organic polymeric filter cloth media or inorganic filter cloth media depending on the material performing the separation function. A single disk or cassette of a cloth disk filter may have a filter area ranging from 1 to about 200 ft$^2$, or from 1 to about 50 ft$^2$, or from 1 to about 20 ft$^2$, and there may be upwards of 10 filter cassettes in a single combined sludge blanket/filtration vessel. The filter area is dictated largely by the filtration task at hand, size of the vessel and influent solids loading and flow rate, and the like. It is understood that an organic filter cloth media might comprise inorganic materials, and vice versa.

Suitable cloth filter media may be woven or nonwoven, and may comprise one layer or may be multi-layered. The material selected for the filter cloth media should have numerous attributes that render the filter cloth media suitable for filtration service, such as structural integrity to withstand the pressure gradients of filtration and backflushing, and chemical resistance to attack or dissolution by the filtered species, filtrate, and chemical cleaning solutions such as chlorine, citric acid, sodium hydroxide, and other chemicals designed to minimize organic and inorganic fouling of the filter cloth media. The material should also have the ability to be fabricated readily into the preselected filter cloth media shape for a particular application. One useful cloth filter material is a nonwoven, needlefelted nylon (polyamide) fiber-based material. The same material in "pile" form is another suitable filter material. "Pile" and "needlefelting", and "needling" are terms of art in the manufacture of nonwovens, and are readily understood by those skilled in the nonwovens art. Piled materials may also be needlefelted. Additional design criteria and considerations in the fabrication and selection of cloth disk filter media are disclosed in Purchas and Sutherland, "Handbook of Filter Media", Elsevier Science Ltd. (2002), which is incorporated herein by reference, and especially Chapters 2 and 3 entitled "Woven Fabric Media" and "Nonwoven Fabric Media", respectively. Patents describing piled and/or needled nonwovens include U.S. Pat. Nos. 3,673,048 and 3,755,055, both incorporated herein by reference. In certain embodiments, the filter material may comprise membrane materials or fine screened mesh (such as stainless steel screen mesh).

Pumps described in the various embodiments may be submersed in the liquid in vessel 2, or they may be positioned outside of the vessel 2. Cloth filter disk apparatus and methods of this disclosure may also include, or be fluidly connected with a chemical addition system, which may include mixers, pumps, tanks for flocculating chemical and other chemicals, which may be polymeric, flow meters, and the like. Cloth filter disk apparatus and methods of the present disclosure may include various sampling and viewing ports, as well as physical, chemical and biological property measurement devices, such as temperature, pressure, turbidity, flow rate (mass and/or volume), color, composition, particle size, and the like. The details of these sub-systems are readily understood by those skilled in the water and wastewater treatment art, and require no further explanation herein. It is also very common today to include data logging systems, such as one or more PCs and/or server computers running data acquisition software which may be accessed onsite or remotely.

In operation, modified cloth disk filters of the present disclosure operate as follows. Flow enters the filter through an influent conduit as described in FIGS. 8-10 and through one or more influent distribution headers near the bottom of the cloth disk filter vessel. If a sludge blanket is used, at steady state, after a sludge blanket has been built up, or transferred into vessel 2 from prior operations, the influent first moves substantially upward through and contacts the sludge blanket in the sludge blanket zone, removing the heavier and/or larger floc portions. The partially cleaned influent then moves up into the cloth disk filter zone and completely surrounds the cassettes and cloth filter media. As the flow passes through the cloth filter media, any remaining suspended solids are removed. The operator monitors the operation to view the filtered effluent of each filter cassette through the individual discharge ports. As solids accumulate on the cloth filter media, the flow through the media becomes restricted and the level of liquid in the vessel rises. The backwash process is triggered when the level reaches a pre-determined point or after a set time period. The outside-to-inside flow ensures that solids stay trapped within the vessel. In some embodiments, at least some of the backwash headers rotate across the surfaces of the disks, removing captured solids from the media. In certain embodiments, the backwash headers rotate clockwise 360 degrees and then return counter-clockwise in sequence for efficient media cleaning, but this is not strictly necessary. The fixed-disk design may incorporate one or more fixed disks with rotating suction backwash headers that do not touch the cloth media, thus extending the life of the media. In embodiments such as embodiment 500 illustrated in FIGS. 8-10, backwash headers move upwards or downwards, or reciprocate upwards and downwards as desired. In embodiment 500 and similar embodiments, there is no need to drain the tank when replacing cassettes, saving water treatment facilities time and money. In certain embodiments, each disk may be monitored separately, so effluent performance may be easily verified and segments requiring service are easily identified.

Cloth disk filters described herein may be used in biological treatment systems, for example, but not limited to, activated sludge systems, such as conventional activated sludge, extended aeration, complete mix activated sludge, continuous flow activated sludge, various batch reactor activated sludge systems, integrated fixed-film activated sludge (IFAS) and submerged fixed film (SFF) systems, and the like. They may also be used in non-biological systems, for example, but not limited to, metal precipitation, surface water treatment, cooling tower blow down treatment, and the like.

Backwash headers described herein and their equivalents can be retrofitted in existing cloth disk filters, or installed as new equipment in new cloth disk filters. Cloth disk filters of this disclosure can be retrofitted to existing concrete basins or sold as complete stand-alone filtration units. The units are user-friendly, high performance tertiary filters, suitable for both small and large flow applications, that remove suspended solids as small as 10 microns or less in certain embodiments, suitable for use in water and wastewater plants that have stringent suspended solids discharge permit requirements, phosphorous limits or require re-use quality effluent.

The various advantages of the described backwash headers and filter cloth media module configurations and modes will be readily understood by those of ordinary skill in the art upon reading this disclosure. Selection of backwash header and filter cloth media module configuration and mode of operation typically devolves to choosing those which provide maximum advantage and least disadvantage for a specific separation to be effected. It is believed the backwash headers described herein, and cloth filter disks employing them, will provide many advantages.

Although the foregoing examples and description are intended to be representative of the disclosure, they are not intended to in any way limit the scope of the appended claims.

What is claimed is:

1. A filtration apparatus for treating water or wastewater comprising:
   a vessel having a floor and walls;
   a cloth filter zone within said vessel including at least one cloth filter cassette positioned vertically therein;
   a backwash pump; and at least one backwash header positioned adjacent a main filter surface of said at least one cloth filter cassette, wherein said at least one backwash header comprises:

an elongate tubular body having a length, a diameter, first and second ends, a longitudinal axis, and an exterior surface, the tubular body defining at least one internal cavity, the body comprising at least one suction slot to allow fluids and solids to enter the cavity, from outside of the exterior surface; and a hood structure comprising first and second substantially cylindrical rods extending substantially parallel to the slot and attached to the tubular body, and third and fourth substantially cylindrical rods extending substantially perpendicular to the slot and attached to the body, wherein said hood structure is attached to a portion of the exterior surface of the tubular body around and extending away from the suction slot to form a chamber defined by the hood structure and a portion of the exterior surface near the slot, the chamber comprising first and second sub-chambers on opposites sides of the slot, wherein the sub-chambers have sufficient volume to allow gradual straightening and relaxing of fibers of a filter material being cleaned by the backwash header, wherein the hood structure allows relatively clean fluid to pass through the filter material in a reverse direction upon application of a suction pressure in the internal cavity by said backwash pump, and allow the relatively clean fluid and solids previously adhered to the fibers to enter the chamber, then the slot and internal cavity while substantially preventing other relatively less clean fluids and solids from entering the chamber, slot and cavity.

2. The apparatus of claim 1 wherein the first and second substantially cylindrical rods each have a rod diameter and the tubular body has a diameter such that the rod diameter is one quarter of the diameter of the tubular body or less.

3. The apparatus of claim 1 wherein the first and second substantially cylindrical rods each have a rod diameter such that the rod diameter is one eighth of the diameter of the tubular body or less.

4. The apparatus of claim 1 comprising a single slot.

5. The apparatus of claim 4 wherein the slot is substantially parallel to the longitudinal axis of the body and has a rectangular shape.

6. The apparatus of claim 5 wherein the slot has a length that is less than the length of the body.

7. The apparatus of claim 6 wherein the slot is positioned away from the first and second ends of the body.

8. The apparatus of claim 1 comprising two slots positioned on substantially opposite exterior surface portions of the body, wherein each slot is substantially parallel to the longitudinal axis of the body, each slot has a length that is less than the length of the body, the lengths of the two slots being substantially equal, the slots positioned away from the first and second ends of the body.

9. The apparatus of claim 1 wherein the tubular body has a cross-section selected from the group consisting of circular, oval, and polygonal.

10. The apparatus of claim 1 wherein the slot has a width that is smaller than a length of the fibers in the filter material.

* * * * *